Sept. 1, 1953  R. C. BOHL  2,651,013
ELECTRIC WINDSHIELD WIPER CONTROL
Filed Nov. 3, 1950  4 Sheets-Sheet 2

INVENTOR
ROBERT C. BOHL.
BY Martin J. Finnegan
Attorney

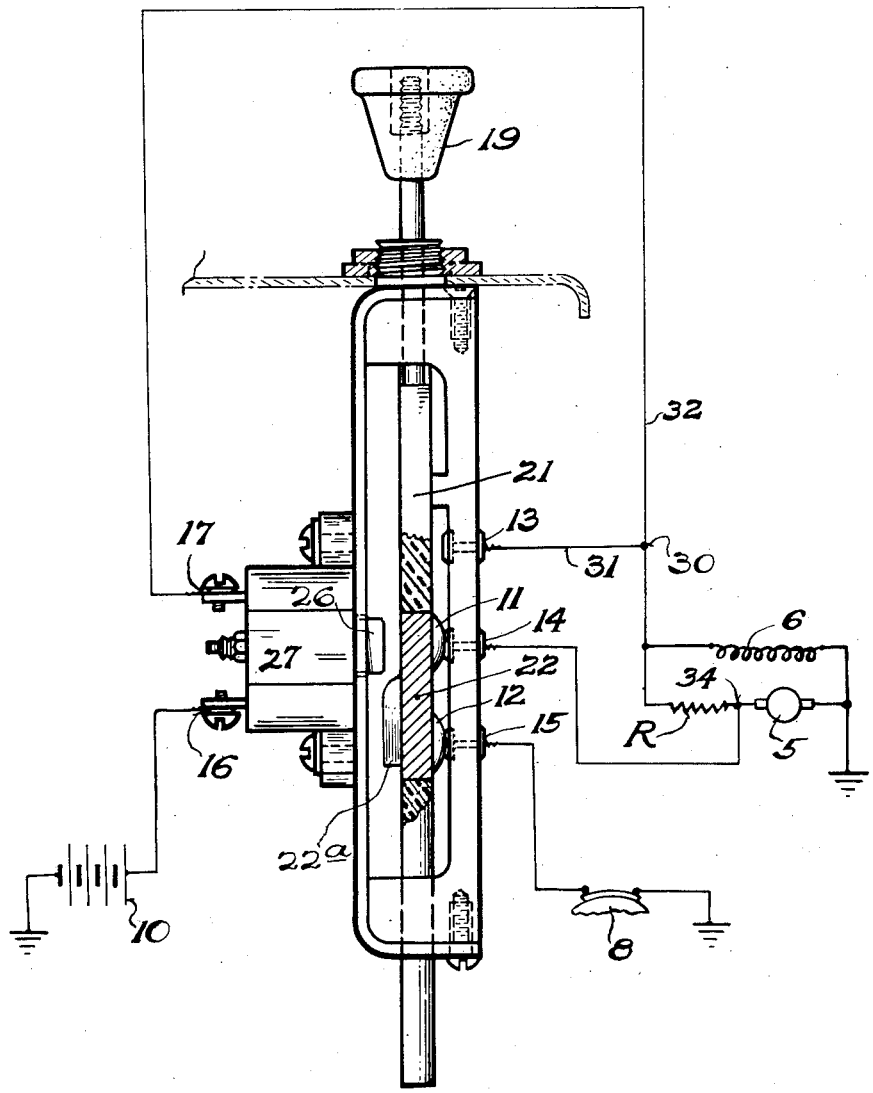

Patented Sept. 1, 1953

2,651,013

UNITED STATES PATENT OFFICE 2,651,013

ELECTRIC WINDSHIELD WIPER CONTROL

Robert C. Bohl, Sturtevant, Wis., assignor to Redmond Company, Inc., Owosso, Mich., a corporation of Michigan Application November 3, 1950, Serial No. 193,977

2 Claims. (Cl. 318—275)

1

This invention relates to windshield wipers, and particularly to the electrically driven types of wiper drives.

In electrical systems for driving windshield wiper operating linkages, it is desirable to include in the motor-energizing circuit some provision for insuring the stopping of the motor at a predetermined point in its rotary path, corresponding to the point in which the wiper blades will be at the lower limit of their oscillatory path. To achieve such a result certain prior art systems have incorporated mechanical braking arrangements, and others have employed dynamic braking means in various forms. The present invention utilizes a novel application of the dynamic braking principle, characterized in that, substantially, simultaneously with production of a reverse magnetic effect across the motor armature, to bring it to a stop, there is an energization of a thermal unit operating as a circuit breaker. The contact or bridging element of this thermal unit is in the main circuit leading to the motor, and the manner in which this thermal unit cooperates with related parts when the wiper blade has reached the "parked" position following manual initiation of the stopping ("parking") cycle assures immediate armature deceleration to a full stop.

It is accordingly an object of the invention to provide a novel method and means of controlling the point of stopping of a windshield wiper mechanism by the operation of automatic mechanism whose functioning is under the control of a single manually operable element serving as a combined electrical and mechanical instrumentality for preventing the automatic elements of the system from operating in any sequence other than the predetermined sequence by which accurate stopping of the mechanism is assured.

Other objects and advantages pertaining to certain features of the disclosed mechanism will be indicated in the following description.

Figure 1:
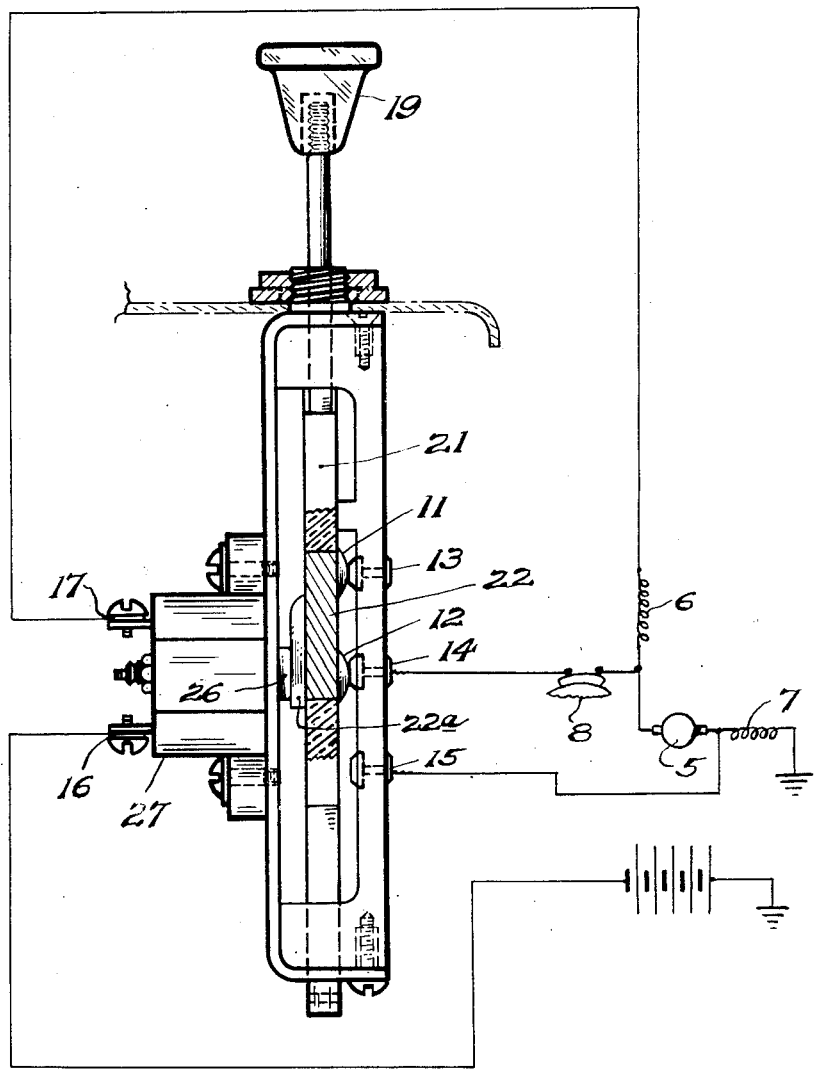
Figure 2:
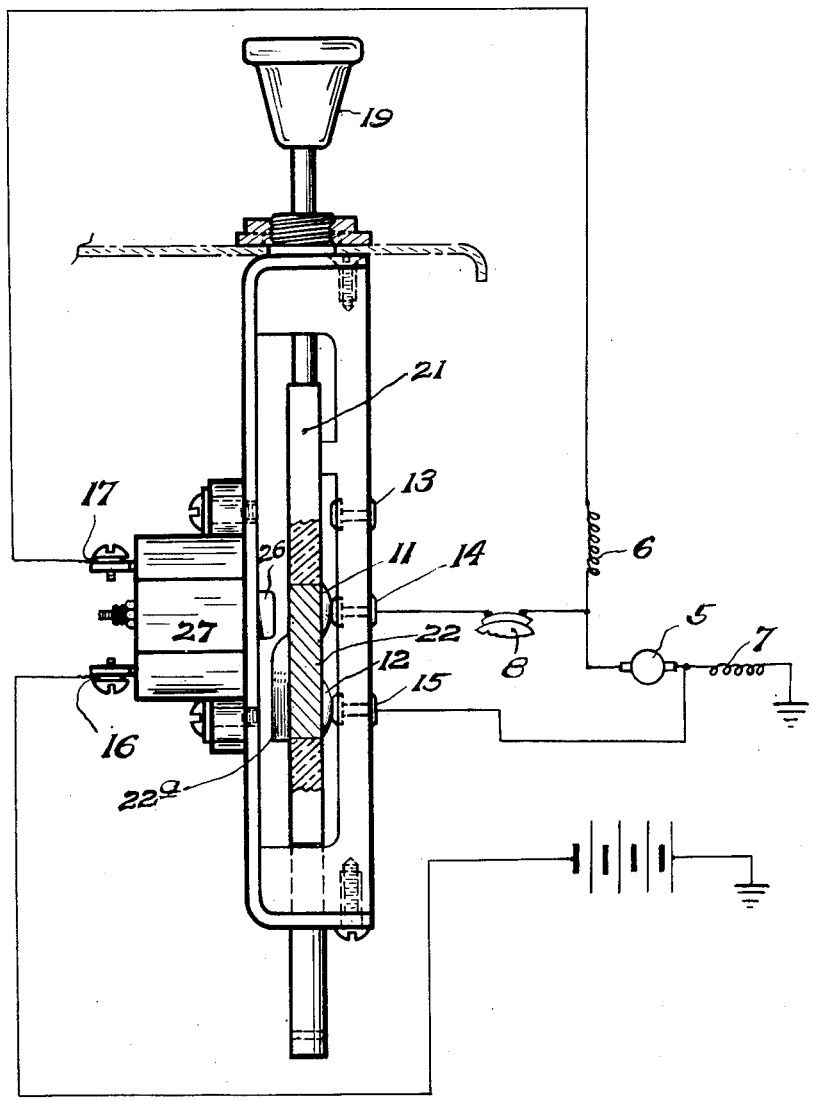

In the drawings Fig. 1 is a view partly schematic and partly mechanical showing the elements entering into the invention as applied to a windshield wiper motor; the relative positioning of the manually operable parts being indicated in the relationships which they occupy while the mechanism is in motion; Fig. 2 is a similar view partly schematic and partly mechanical but with the manually operable elements shown in the relative positions occupied when the mechanism has been, or is about to be brought to a stop, with the wiper blades in

2

Figure 3:
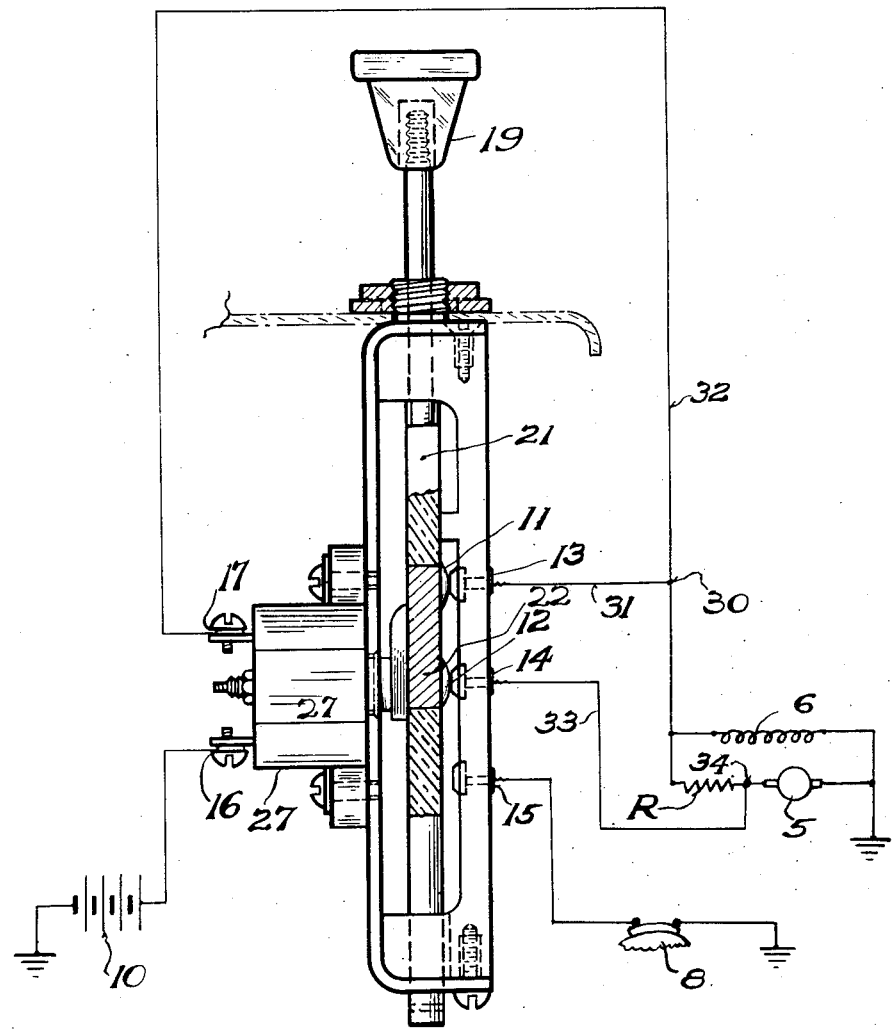

"parked" position; and Figs. 3 and 4 are views corresponding to Figs. 1 and 2 respectively, but with modified electrical connections particularly suitable where the motor to be controlled is of the shunt field type.

In both views the windshield wiper operating motor is shown schematically as including an armature 5 and series field windings 6 and 7, there being also an indication of an automatic switch element 8 adapted to be closed for an instant of time during each revolution of a cam-bearing switch operating element mounted in the usual manner in the gear train (not shown) constituting part of the operating connections between the shaft of armature 5 and the wiper blades. Such a cam-operated switch constitutes a part of substantially all commonly used windshield wiper control circuits and may be considered as corresponding in general principles to the cam-operated switch of the Coxon et al. Patent No. 2,364,603 or the Whitted Patent No. 2,370,101, there being no claim made herein to such a cam-operated switch, per se, but only to the novel inter-relationships shown herein as existing between said cam operated switch 8 on the one hand and the manually controlled switch elements shown at 11, 12, 14, 15, 16 and 17 in both Figures 1 and 2 and now to be described.

The switch elements 11 and 12 are shown as rounded projections integral with a slidable push-pull rod 21 having a current conducting portion 22 joining the two projections 11 and 12. When the rod 21 is in the position indicated in Fig. 1 the said elements 11, 12 and 22 are not in bridging relationship to the stationary contacts 14 and 15; the armature shorting circuit therefore is inoperative due to the incomplete path even though cam switch 8 closes at one stage of each revolution of the motor-driven gear carrying the operating cam. However, upon shifting of the rod 21 to the motor-stopping position (Fig. 2) there is provided a condition of bridging as between the stationary contacts 14 and 15. In addition to the contact bridging function of the element 22 the said element has an appendage 22a whose function is to cooperate mechanically with the adjacent actuating element 26 of a snap-action thermostatic switch 27 of any well known type of manufacture, which switch 27 is shown as having the terminals 16 and 17 heretofore referred to. When the elements 22 and 26 are in the abutting relationship indicated in Fig. 1 the said actuating element 26 is shifted to its extreme leftward position and is held in such position by the pressure of the projecting portion 22a of the said element 22. In this leftward position the striker element 26 of the thermostatic switch assembly is in position to operate as an automatic re-setting agency with respect to the thermostatic switch, to permit the latter to return to closed-circuit position when sufficiently cooled. On the other hand, when the push rod 21 is moved inwardly to the Fig. 2 position—a manual operating knob 19 being attached thereto as indicated—the actuating element 26 is no longer restrained by the element 22a and is accordingly free to snap to the right just as soon as excessive electrical current conditions initiate such a circuit-breaking impulse.

The cooperating elements having now been described, the operation of the system will be readily apparent. With the parts in Fig. 2 position the circuit to the motor 5 is opened at the switch 27 and the parts are at rest; but as soon as the manually operable rod 21 is shifted to the Fig. 1 position the switch 27 is automatically re-set in the closed position and the motor is immediately energized by reason of the current flowing thereto by way of the said thermostatic switch 27 which has now been reset to the circuit closed position by reason of the pressure of the element 22a against the striker element 26. It will be observed that this motor-energizing circuit is independent of the cam-operated switch 8 and therefore the motor will continue to run and operate the wiper blades notwithstanding the fact that the switch 8 is alternately closed and opened on each revolution of the motor-operated cam element associated therewith.

Now when it is desired to bring the motor and the wiper blades to a stop the rod 21 is manually returned to the Fig. 2 position whereupon the cam rotated by the motor will become effective, immediately upon the next ensuing closure of the switch 8, to establish a short circuit condition in the armature windings, the said short circuit being by way of the now bridged contact elements 14 and 15. This short circuited condition will produce such an instantaneous dynamic braking action as to bring the motor and hence the wiper blades to practically an immediate stop, the blades being thus stopped promptly and positively in the exact predetermined parking position. At the same instant the thermostatic switch 27 will be subjected to excessive current flow by reason of the stalled condition of the armature, and this excessive current flow will immediately snap said switch 27 to the open position—the striker element 26 being free to move to the right under this snapping impulse, since the restraining element 22a is now out of its path. Accordingly all current flow now ceases and no further operation of the wiper mechanism will occur until the rod 21 is again shifted to the Fig. 1 setting, to repeat the cycle of events heretofore traced.

Figs. 3 and 4 show one manner in which the electrical connections of Figs. 1 and 2 may be modified for application to a motor with its field winding 6 in shunt with the armature windings 5, rather than in series, as in Figs. 1 and 2. These modifications comprise the addition of a resistor R of relatively low ohmic value, and the addition of a wire 31 connecting contact 11 with the main conductor 32, as shown at 30, and a wire 33 connecting contact 14 with the armature circuit at 34, to shunt out the resistor R during normal operation of the motor (Fig. 3 position). Upon shifting rod 21 to the motor-stopping position (Fig. 4) the next ensuing closure of motor-operated cam switch 8 will set up a short circuiting condition in the armature, by way of contacts 14 and 15, exactly as in the Fig. 2 circuit. This condition immediately establishes a dynamic braking action sufficient to stall the wiper linkage in the "parked" position of the blades, assuming that the cam switch 8 has been correctly located in relation thereto. At the same time the two parallel circuit branches containing the resistor R and the shunt field winding 6 become effective to draw additional current from the source 10, and this additional current causes the thermostat switch 27 to snap open, as in the Fig. 2 arrangement.

What I claim is:

1. In a windshield wiper control circuit, a source of current, a wiper linkage drive including a motor having armature and field windings, a first circuit including a thermostatic switch connecting said armature and field windings with said source, a periodically closing motor-operated switch, a second circuit including said armature winding and said periodically closing switch, normally separated switch elements in said second circuit, and manually operable motor-starting and stopping means for bridging said normally separated switch elements to create a short-circuiting condition in said armature winding by way of said second circuit on the next ensuing closure of said periodically closing switch, to exert a dynamic braking effect on the motor prior to interruption of said first circuit and thereby stall the wiper linkage, said means further operating to cause the opening of said thermostatic switch by reason of the increased current flow in said first circuit as a result of said dynamic braking effect.

2. Wiper control mechanism as defined in claim 1, wherein said manually operable means includes a part engageable with said thermostatic switch to re-set said switch to the closed position only when said manually operable means is shifted to the motor-starting position.

ROBERT C. BOHL.

References Cited in the file of this patent
UNITED STATES PATENTS

| Number | Name | Date |
|---|---|---|
| 2,364,603 | Coxon et al. | Dec. 12, 1944 |